(12) United States Patent
Jansen et al.

(10) Patent No.: US 6,390,129 B2
(45) Date of Patent: May 21, 2002

(54) PROPORTIONAL SOLENOID-OPERATED FLUID METERING DEVICE

(75) Inventors: Harvey B. Jansen; Craig S. Jansen, both of Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 0 days.

(21) Appl. No.: 09/737,082

(22) Filed: Dec. 14, 2000

Related U.S. Application Data

(60) Provisional application No. 60/170,880, filed on Dec. 15, 1999.

(51) Int. Cl.[7] .......................... F15B 13/044; F16K 31/06
(52) U.S. Cl. ............................. 137/625.65; 251/129.08; 251/129.16
(58) Field of Search ................. 137/625.65; 251/129.08, 251/129.16

(56) References Cited

U.S. PATENT DOCUMENTS

| | | | | |
|---|---|---|---|---|
| 3,861,643 A | | 1/1975 | Moffatt | |
| 3,880,476 A | * | 4/1975 | Belart et al. | 137/625.65 X |
| 3,926,405 A | * | 12/1975 | Arnold | 251/129.08 |
| 4,463,332 A | | 7/1984 | Everett | 335/258 |
| 4,635,683 A | | 1/1987 | Nielsen | 137/625.65 |
| 4,995,586 A | | 2/1991 | Gensberger et al. | 251/30.04 |
| 5,261,371 A | | 11/1993 | Sumida et al. | 123/339 |
| 5,407,174 A | | 4/1995 | Kumar | 251/129.08 |
| 5,787,915 A | | 8/1998 | Byers et al. | 137/1 |

* cited by examiner

Primary Examiner—Gerald A. Michalsky
(74) Attorney, Agent, or Firm—Quarles & Brady LLP

(57) ABSTRACT

A device for metering pressurized fluid in proportion to a supplied input signal to a solenoid provides non-proportional magnetic flux rectified by a piece-wise non-linear spring assembly. The non-linear spring assembly includes a pair of flexure springs each with four independent spring fingers. The spring fingers supply a plurality of piece-wise forces opposing movement of the armature caused by magnetic flux generated by an electromatic coil to provide a non-proportional opposing force the non-proportional force of the magnetic flux. This allows the metering valve to be moved, and thereby fluid metered, in proportion to the input signal supplied to the coil. A position transducer can be coupled the armature to provide valve position feedback to an electronic control unit for correcting deviations in the actual position of the valve.

14 Claims, 5 Drawing Sheets

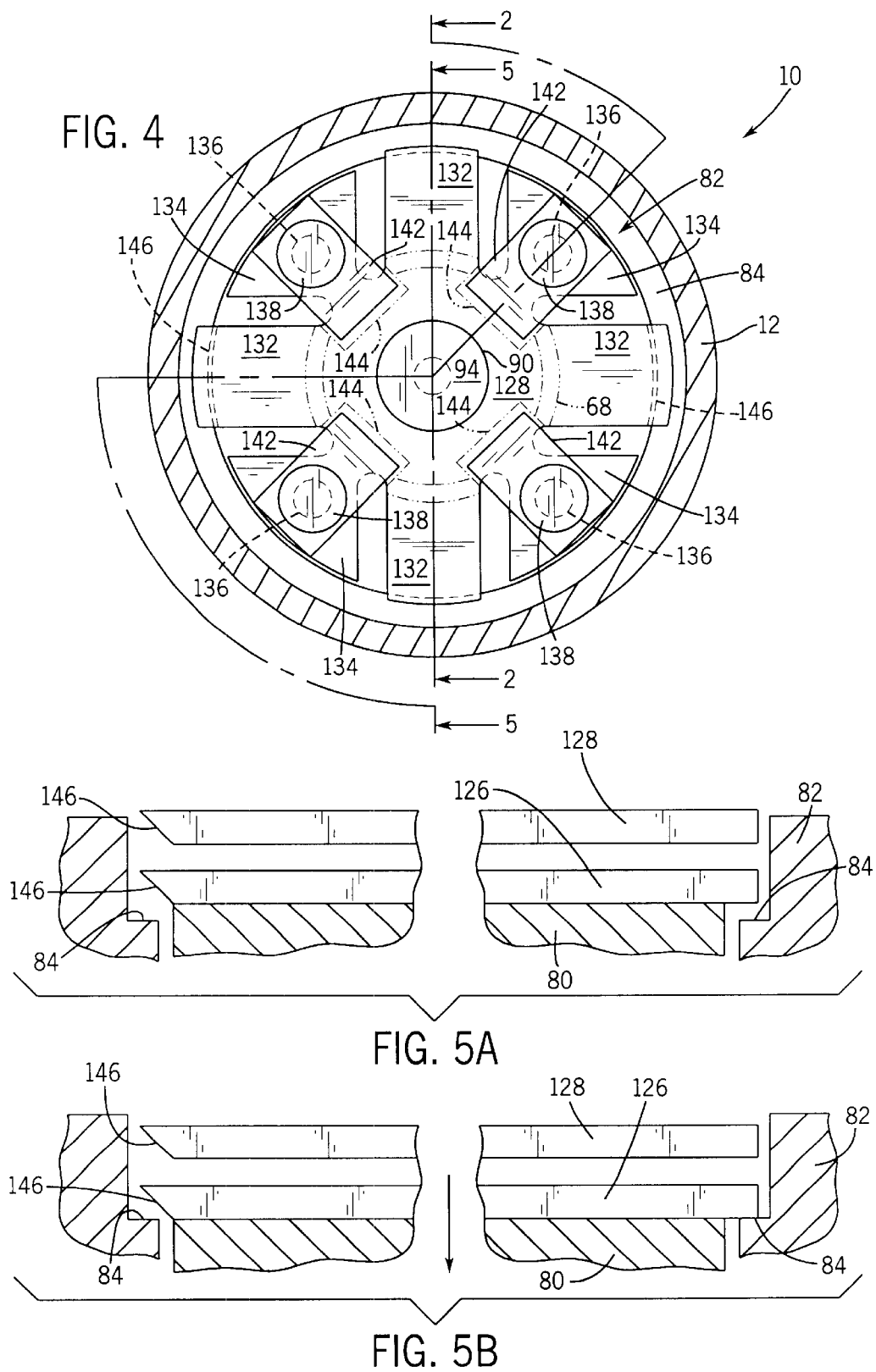

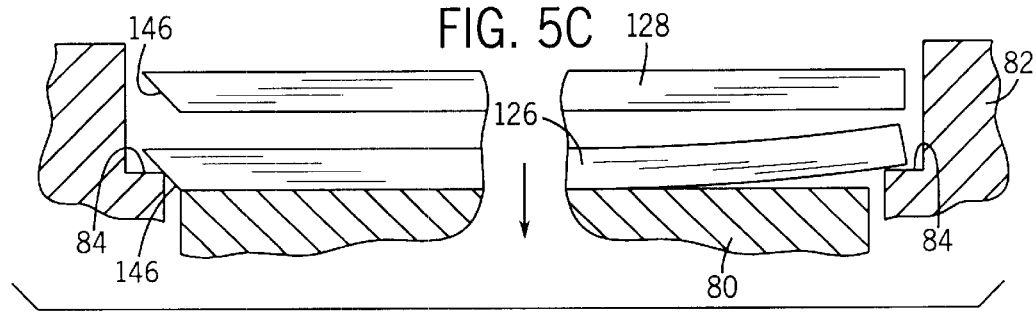
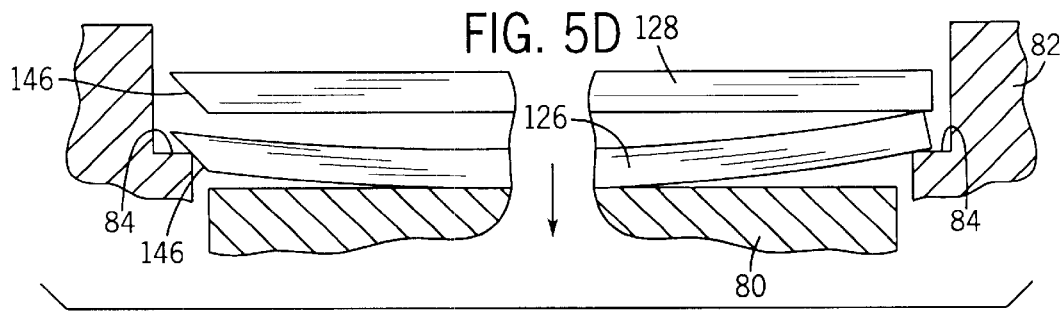
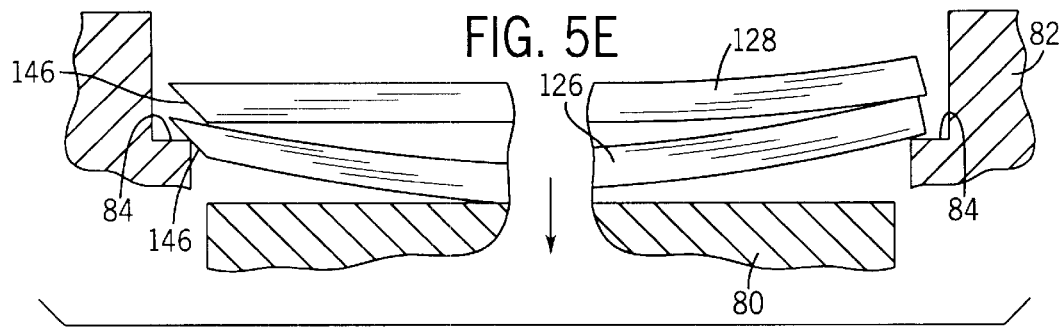
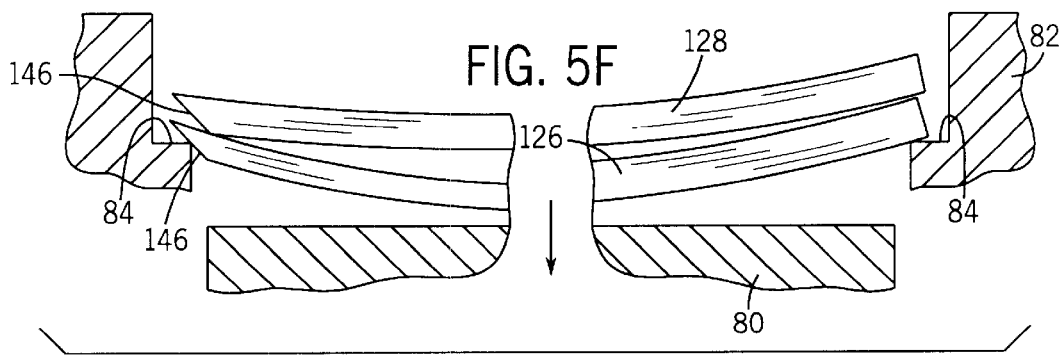

PROPORTIONAL SOLENOID-OPERATED FLUID METERING DEVICE

CROSS-REFERENCE TO RELATED APPLICATIONS

This application claims benefit to provisional application Ser. No. 60/170,880, filed Dec. 15, 1999.

STATEMENT REGARDING FEDERALLY SPONSORED RESEARCH OR DEVELOPMENT

Not applicable.

BACKGROUND OF THE INVENTION

The present invention relates to metering valves and in particular to high precision fluid metering valves.

Solenoid type metering valves are well known. Such valves include an inductive coil that when energized attracts or repels an armature which in turn moves a valve member to control flow, for example, of hydraulic fluid or fuel. Solenoid type metering valves are beneficial in that they are relatively simple to design and include a limited number of movable components. Proportional solenoid type metering valves are also well known. Proportional valves control flow rate in proportion to the input signal (current) supplied to the coil which is desirable for accurate control of the valve. Conventional proportional valves can perform quite well for many applications.

However, in precision metering applications, such as when metering fuel and other combustible media to jet and rocket powered vehicles or in applications where the valve is used as an actuator positioning device, the valves must reliably provide consistent and responsive pressure and flow control. In particular, they must be accurate over a wide range of flow rates (high turn-down ratio) and have minimal internal leakage, low power consumption and low hysteresis. They must also be compact.

Solenoid type metering valves operate by generating magnetic flux which pulls an armature to move the valve. The attractive force of magnetic flux on a metallic body becomes stronger and more non-linear the closer the body is to the source of the flux. Large gaps between the armature and the coil require high current levels and/or prohibitive large coils. Thus, in compact valves where the armature is in close proximity to the coil, the position of the armature, and thereby the valve, will vary non-linearly or non-proportionately with the input signal to the coil. This non-linearity tends to make the valves bi-stable as the air gaps between the armature and the coil decrease. This can lead to large fluid pressure oscillations and undesirable instability making the valve inaccurate and difficult to control with precision. Accordingly, the armature movement must be linearized in some manner. However, this can be complicated because a simple linear spring acting on the armature will not maintain proportional movement throughout its usable range.

There have been many means of linearizing the force acting on the armature in compact packages. One known means is to use conically shaped openings for the air gaps between the armature and the coil. However, this can impart relatively large side loads on the armature leading to high friction and poor hysteresis. Low-friction guides or suspension systems for the armature can be used to reduce the side loads, such as in U.S. Pat. Nos. 3,861,643 and 4,635,683, however, they add cost and can be difficult to implement. The '643 patent discloses another means of providing a valve by the saturation of the magnetic flux at different sized air gaps in the core of the armature. However, as mentioned, this technique requires a complex frictionless suspension system.

Accordingly, an improved precision proportional solenoid type metering valve is needed.

SUMMARY OF THE INVENTION

The present invention provides an improved proportional solenoid-operated device for accurately metering fluid using a unique piece-wise non-linear spring to rectify induced movement from magnetic flux that is not proportional to the input signal. In particular, the invention includes a housing containing an electromagnet coil for translating an armature to move a metering valve. The movement of the armature, and thereby the metering valve, is linearized to the coil input signal by the non-linear spring applying counteracting forces on the armature in a stepped or piece-wise manner.

Specifically, the housing defines a valve chamber in fluid communication with an inlet port and an outlet port. The electromagnetic coil in the housing produces magnetic flux varying non-proportionally to an input signal. The armature can be translated by the induced magnetic flux along the stroke axis toward the coil. The metering valve can be moved along the stroke axis by the armature. The non-linear spring communicates with the armature and has a plurality of spring fingers extending radially with respect to the stroke axis to independently engage between the armature and a stationary structure at different points as the armature is translated along the stroke axis. This provides a summing of forces from each spring finger acting on the armature counter to the force induced by the magnetic flux so that positioning the metering valve is more nearly a linear function of the input signal to the coil.

At least one of the spring fingers has a different thickness so that thicker spring fingers deflect before thinner spring fingers.

In a preferred form, the non-linear spring is an assembly of flexure springs spaced apart and perpendicular to the stroke axis. Each flexure spring includes four independently flexible spring fingers extending radially outward in the same plane at ninety degrees from each other. The four spring fingers of each flexure are arranged in two pairs of opposite spring fingers each pair extending radially outward at a right angle. Two of the four pairs of spring fingers have tapered tips of decreased thickness defining an angled contact surface for contacting a fixed structure in the housing. As the armature is translated along the stroke axis toward the coil, the non-linear spring provides piece-wise forces acting on the armature by flexure of the four pairs of spring fingers at different portions of the armature stroke by contact of the spring fingers of the first flexure spring with the fixed structure and contact of the spring fingers of the second flexure spring with the corresponding spring fingers of the first flexure spring. This arrangement provides four distinct spring forces applied against the armature at various portions of the stroke.

An elongated axial rod can be attached to the armature and a compression spring can be disposed about the rod to bias the armature away from the coil. The compression spring provides a fifth distinct spring rate acting against the armature.

The metering valve assembly includes a generally cylindrical guide fixed to the housing along the stroke axis. The guide has inlet and outlet openings in fluid communication with respective the inlet and outlet ports of the housing. A cylindrical valve member can slide along the diameter of the guide to alternatively block the inlet and outlet openings in the guide and thereby control flow through the device. A valve carrier is disposed about the valve and has an annular flange surface engaging an outer circumferential shoulder of the valve. A compression spring, retained by an annular spring retainer fixed to the guide, is disposed about a portion of the valve to engage the shoulder and bias the valve toward, and the valve carrier in contact with, the armature.

In another form, the device includes an electronic control unit for controlling the operation of the coil. The device can also include a position transducer electrically coupled to the control unit and having a sensing coil and a metallic transducer element fixed to the elongated rod and disposed axially within the sensing coil of the position transducer. The position transducer provides a feedback signal to the control unit corresponding to the position of the transducer element. The control unit can adjust the input signal supplied to the coil in response to the feedback signal. Preferably, the control unit includes a comparator which compares a commanded metering valve position to an actual metering valve position detected by the position transducer. The control unit adjusts the input signal until the difference between the commanded and actual position is an acceptable value near zero.

Thus, the present invention provides a device for metering fluid in proportion to an input signal. This is accomplished using a simple and inexpensive non-linear spring assembly having two flexure springs with pairs of spring fingers of different thickness acting independently in a piece-wise manner to oppose armature movement induced by the magnetic flux generated by the coil. The incrementally increasing spring forces produce opposing forces corresponding to the magnetic flux as the distance between the armature and the coil changes. Since the magnetic flux pulling force is not proportional to the input signal to the coil, the resulting force of the non-linear spring assembly provides a counteracting non-proportional force throughout the stroke of the valve, which linearizes the movement of the metering valve assembly so that it is proportional to the coil input signal (current). Moreover, the feedback signal of the position transducer can be used to adjust the input signal to rectify discrepancy between the actual position of the meter and the position corresponding to desired fuel flow. In this way, the device provides for accurate metering suitable for use in precision actuator positioning or fuel metering applications, such as jet and rocket engines.

These and still other advantages of the present invention will be apparent from the description of the preferred embodiments which follow.

BRIEF DESCRIPTION OF THE DRAWINGS

FIG. 4 is a front view of a flexure spring assembly used in the metering device;

FIGS. 5A–5F are partial cross-sectional views taken along path 5—5 of FIG. 4 showing the flexure spring assembly in various stages of deflection at various positions of the armature stroke.

DETAILED DESCRIPTION OF THE PREFERRED EMBODIMENT

Figure 1:
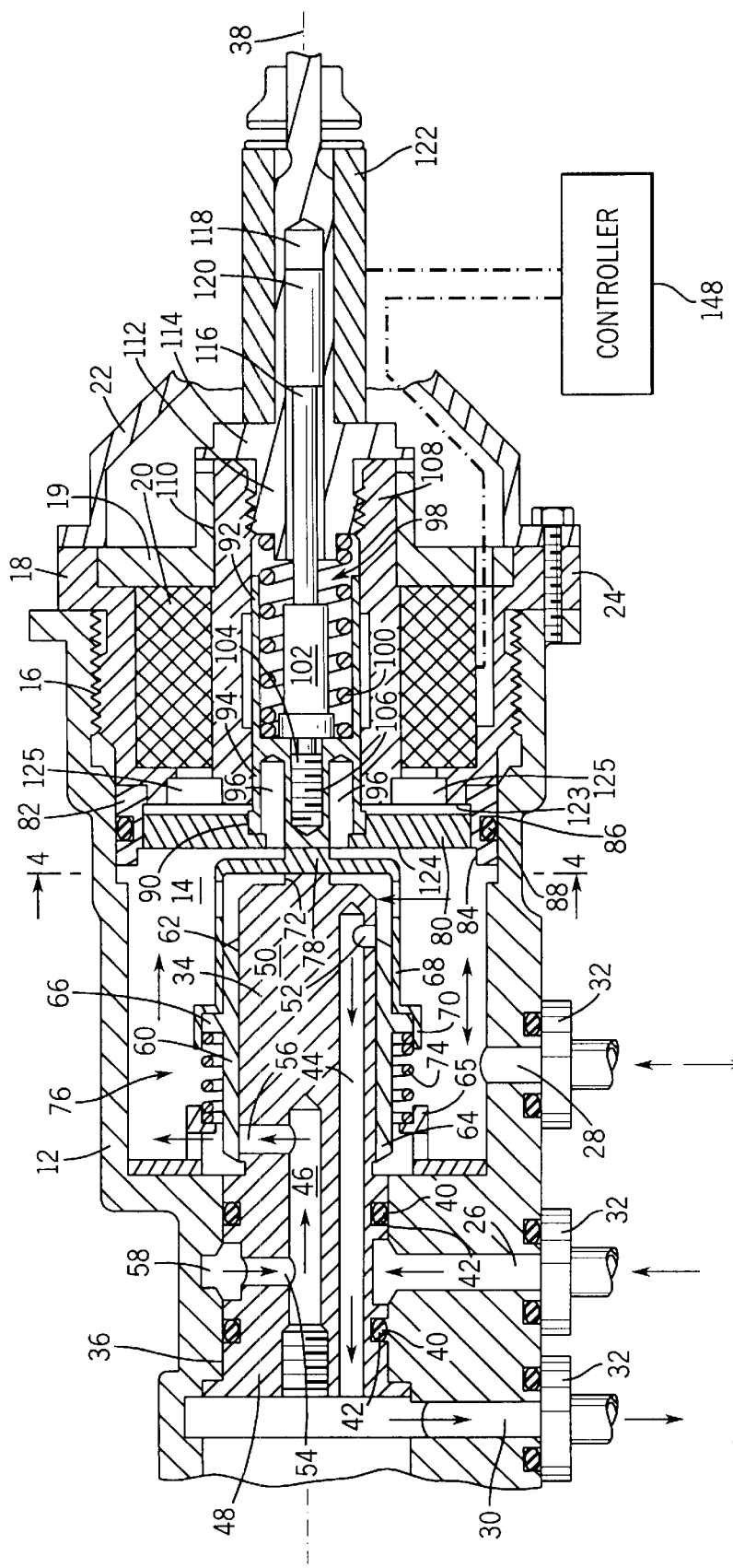
FIG. 1 is a side cross-sectional view of the metering device.

Referring to FIG. 1, the invention provides a fluid metering device 10 having a preferably aluminum housing 12 defining a valve chamber 14 and having an internally threaded end 16 to which is threaded an annular iron alloy bobbin 18 supporting an electromagnetic coil 20 covered by a backing plate 19. The housing 12 is enclosed by an end cap 22 bolted to a flange 24 of the housing 12. The housing 12 includes three radially extending inlet 26, outlet 28 and return 30 ports, in fluid communication with the valve chamber 14. The ports 26, 28 and 30 couple the metering device 10 via fittings 32 to a fluid line between a fluid reservoir and an actuator so as to allow pressurized fluid into and out of the device 10, as discussed in detail below. The device 10, as shown in the drawings, is preferably used to meter hydraulic oil to actuators.

The inlet 26 and return 30 ports communicate with the valve chamber 14 through a generally cylindrical valve guide 34, which is mounted within an opening 36 of the housing 12 along a stroke axis 38 and sealed by resilient seals 40 disposed in annular grooves 42 in the outer circumference of the guide 34. The guide 34 includes return 44 and outlet 46 axial bores extending through an outer end 48 of the guide 34 and into the guide 34 different distances. The return axial bore 44 extends proximate an inner end 50 of the guide 34 and is intersected at its end by a radial bore 52. The inlet axial bore 46 extends axially by a lesser distance and is intersected at an intermediate point by radial bore 54 and at its end by radial bore 56. The inlet axial bore 44 is threaded at the outer end 48 of the guide and is closed by a suitable sealed threaded stopper (not shown). The intermediate radial bore 54 is in fluid communication with inlet port 26 via an annular channel 58 in the inner diameter of the opening 36. Flow through the guide 34 and the radial bores 52 and 56 is controlled by a valve 60 which is sized to be capable of simultaneously covering radial bores 52 and 56 so that both the inlet 26 and return 30 ports are closed off at approximately mid-stroke.

The valve 60 is a generally cylindrical inverted spool shaped member slidably fit around the outer diameter of the guide 34. The valve 60 has outwardly tapered ends forming a leading metering edge 62 and a trailing metering edge 64. The valve 60 also has a circumferential shoulder 66 at an intermediate position extending radially outward. The valve 60 is retained in an annular valve carrier 68 having a flange 70 at one end engaging the shoulder 66 of the valve 60 so as to move with the valve 60. The valve carrier 68 is held off of the inner end 50 of the guide 34 by a boss element 72. The valve 60 and the valve carrier 68 are biased axially away from the outer end 48 of the guide 34 by a helical compression spring 74 disposed about a portion of the valve 60 and extending between a spring retainer 65 and the shoulder 66. The spring retainer 65 is an annular perforated aluminum member disposed about the guide 34 allowing flow to by the spring 74 without effecting the spring rate. The guide 34 and valve 60 are preferably a non-corrosive material, such as 300 series stainless steel and the valve carrier 68 is a lightweight, non-corrosive material, such as aluminum. These elements along with spring 74 and spring retainer 65 combine to form a metering valve assembly 76.

The position of the valve 60 in the metering valve assembly 76 is controlled by the interaction of the valve carrier 68 and an axially translating armature 80. An axial boss element 78 of the valve carrier 68 is biased in abutment with the armature 80 by the compression spring 74. The armature 80 is a magnetically permeable disk, made for example of cold-rolled steel, disposed generally perpendicular to the stroke axis 38 within a ring 82 at the inner diameter of the housing 12 between the valve chamber 14 and the bobbin 18. The ring 82 is stepped so it includes a circumferential radial surface 84 of greater diameter than the armature 80. The ring 82 includes a circumferential groove 86 containing a resilient seal 88 for sealing the valve chamber 14 from the coil 20 contained in the bobbin 18.

The armature 80 is an annular disk with a stepped central aperture 90 in which is inserted in a stainless steel spring sleeve 92 extending through the center of the coil 20. The spring sleeve 92 has a stepped end 94 engaging the corresponding surfaces of the aperture 90 and having a decreased outer diameter portion protruding axially past the armature 80. The stepped end 94 includes axial bores 96 for receiving fasteners (not shown) for joining the spring sleeve 92 to the armature 80 so that it translates with the armature 80. The spring sleeve 92 also defines an axial cavity 98 in which is disposed a helical compression spring 100 and through which a stainless steel elongated rod 102 extends axially. The rod 102 has a threaded head 104 threaded into an axial bore 106 in the stepped end 94 of the spring sleeve 92. The spring sleeve 92 fits within a cylindrical center 108 of the bobbin 18. One end extends through an annular opening 110 in the backing plate 19 and is internally threaded to mate with a plug 112. The plug 112 has a flanged head 114 that engages the annular opening 110 and an elongated axial tail 116 having an axial bore 118 for receiving the rod 102. The bore 118 in the tail 116 is sized to accept a cylindrical transducer element 120 made of a suitable iron alloy of greater diameter than the end of the rod 102 and permit the transducer element 120 to translate axially. A sensing coil 122 is disposed about the tail 116, and thereby the transducer element 120. The transducer element 120 and sensing coil 122 provide a position transducer for gauging the actual position of the valve 60.

Figure 2:
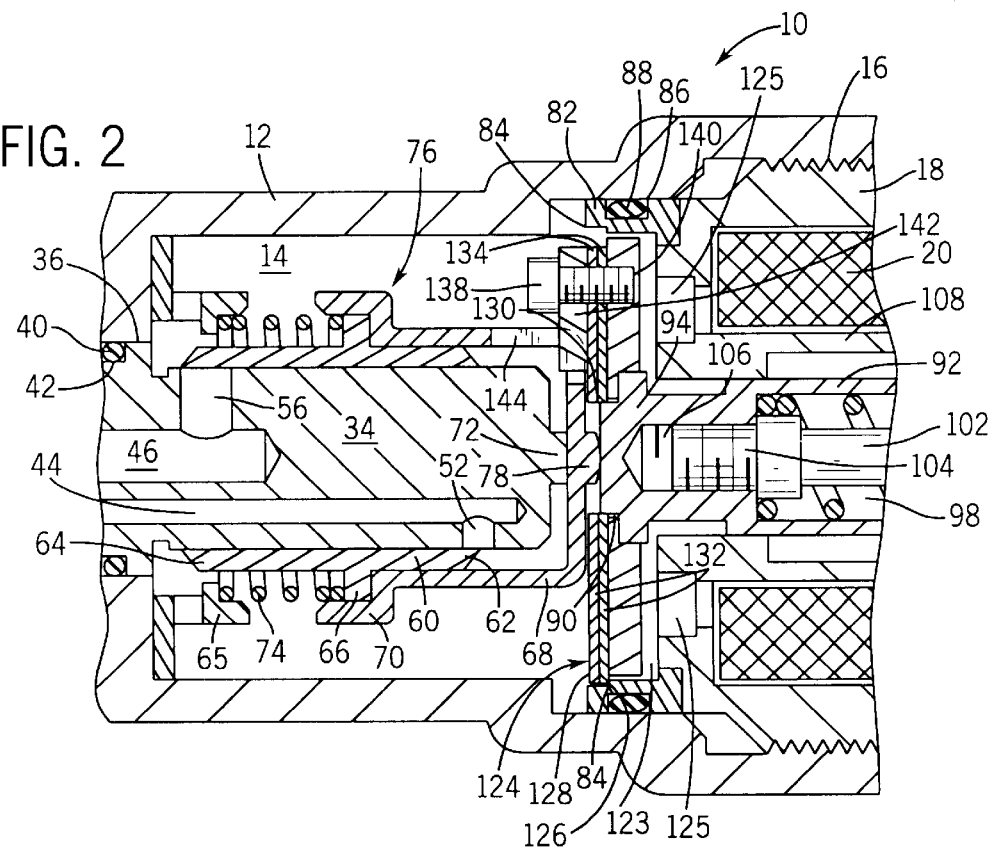
FIG. 2 is an enlarged side cross-sectional view taken along line 2—2 of FIG. 1 showing the metering device with an inlet port closed and a return port open to a valve chamber.

This configuration allows the two compression springs 74 and 100 to apply opposing forces on the armature 80. The springs 74 and 100 provide linear spring rates, however, spring 100 has a higher spring rate than spring 74. Thus, the armature is biased away from the coil 20 and the valve 60 is biased to close radial bore 56 in the guide 34, and thereby shut off inlet port 26, as shown in FIG. 2. In this closed position, radial bore 52 is open so that fuel in the valve chamber 14 can be drawn through the guide 34 and out the outlet port 28 to a return line leading to the fuel tank.

The coil 20 and armature act like a solenoid such that when the coil 20 is energized by an input signal it creates lines of magnetic flux that interact with the armature 80 by following closed looped paths through gaps 123 around the coil 20 and adjacent to the armature 80. Non-magnetic reluctors 125, preferably made of stainless steel, are fit into openings in the bobbin 18 to prevent the flux from bypassing the armature 80. The magnetic flux provides an attractive force that, in combination with the spring force of spring 74, is sufficient to overcome the spring force of spring 100 and cause the armature 80 to translate along the stroke axis 38 toward the coil 20. As the armature 80 translates, spring 74 forces the valve 60 along the stroke axis 38 to open the radial bore 56 and close radial bore 52. This allows fuel to flow through the inlet port 26 through the proper bores in the guide 34 and out to the valve chamber 14 where it can exit the device 10 through the outlet port 28, as shown by the arrows in FIG. 1. When the valve 60 travels the full stroke, which is approximately 0.2 inches, the valve is in the position shown by FIG. 3.

Figure 3:
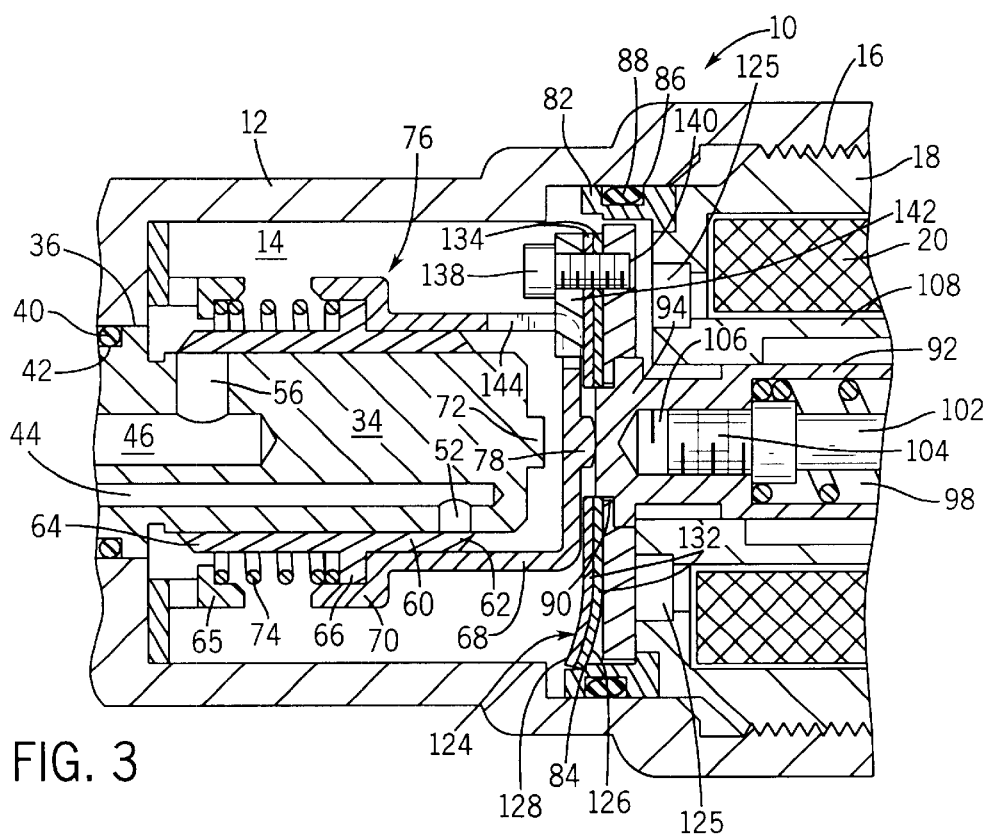
FIG. 3 is an enlarged side cross-sectional view similar to FIG. 2 however with the inlet port fully open and the return port closed.

Referring now to FIGS. 2, 3 and 4, the armature 80 is positioned in close proximity to the coil 20 with a small air gap 123 therebetween. The magnetic flux produced by the coil 20 and acting on the armature 80 is highly non-linear when in such close relation. The armature 80, and thereby the valve 60, would ordinarily translate non-linearly or non-proportionally to the input signal supplied to the coil 20. To prevent this, a piece-wise non-linear spring 124 is mounted to the armature 80 concentric with the stroke axis 38. The non-linear spring 124 provides stepped or piece-wise forces opposing the armature 80 at different parts of the stroke as it is pulled by the energized coil 20. As will be explained, the non-linear spring 124, in combination with spring 100, provides five distinct spring rates opposing the non-linear force generated by the magnetic flux so that movement of the armature 80, and thereby the valve 60, is proportional to the value of the input signal to the coil 20.

Referring to FIGS. 2 and 3, the non-linear spring 124 includes two identical flexures springs 126 and 128 spaced apart in tandem substantially perpendicular to the stroke axis 38. As shown in FIG. 4, each flexure spring is generally a thin disk (approximately 0.018 inches) with a circular opening 130 in the center and four spring fingers 132 extending radially outward at right angles from each other. The spring fingers 132 have three free edges and can be deflected independent of the other spring fingers.

The flexure springs 126 and 128 are joined to together and to the armature 80 at quarter-round sections 134 between the spring fingers 132. The quarter round sections 134 have through bores 136 receiving bolts 138 for threading into threaded bores 140 in the armature 80. A suitable spacer or washer (not shown) is disposed around each bolt 138 to maintain the flexure springs 126 and 128 spaced apart when mounted to the armature 80. The opening 130 in the flexure spring 126 adjacent the armature 80 fits around the protruding end of the spring sleeve 92. Four rectangular lugs 142 with bores disposed about the bolts 138 are used to distribute the loads connecting the flexure springs 126 and 128 together. The valve carriage 68 has slots 144 that accommodate the lugs 142 without interfering with the movement of the metering valve assembly 76.

The spring fingers 132 are sized so that their tips extend radially past the quarter-round sections 134. Each flexure spring 126 and 128 has two, oppositely extending spring fingers 132 with tips having oblique contact surfaces 146 tapering away from the coil 20. Thus, each flexure spring 126 and 128 includes two pair of opposite spring fingers, one pair having a squared tip and the other pair having a tapered tip. The difference in thickness at the midpoint of the contacting surfaces 146 of the tapered spring fingers and the squared spring fingers is approximately 0.002 inches.

Referring now to FIGS. 2, 3 and 5A–5F, when the coil 20 is not energized, spring 100 biases the armature 80 away from the coil 20 which biases the valve 60 to close off flow from the inlet port so that the device 10 is as shown in FIG. 2. In this position, the spring fingers 132 are not deflected as shown in FIG. 5A and only one spring force is acting against the armature 80. When the coil 20 is energized with an input signal, the generated magnetic flux begins to pull the armature 80. As the armature 80 moves through the stroke in this direction, the pair of spring fingers 132 in the first flexure spring 126 with the thicker, squared tips will substantially simultaneously contact the fixed radial surface 84 of the ring 82 mounted to the interior of the housing 12, as shown in FIG. 5B. As the armature 80 continues in this direction these spring fingers will begin deflecting away from the armature 80 and imparting a second spring force opposing the armature 80. As shown in FIG. 5C, these spring fingers will continue deflecting as the armature 80 is translated and the tapered spring fingers will abut the radial surface 84 at the oblique contact surface 146 and then impart a third spring force against the armature 80 as they are deflected. Then, as the armature 80 continues to translate toward the coil 20, a fourth spring force is applied against the armature 80 after the pair of square tipped spring fingers of the second flexure spring 128 contact the squared spring fingers of the first flexure spring 126 and are deflected away from the armature 80, as shown in FIGS. 5D and 5E. Finally, a fifth spring force is applied against the armature 80 as it continues to translate after the second pair of tapered spring fingers abut the back of the first pair of tapered fingers already deflected away from the armature 80, as shown in FIG. 5F. In this position, the valve 60 is at the end of the stroke and is position to close off the return port 30 and completely open the inlet port 26.

Thus, as mentioned, the compression spring 100 and the flexure springs 126 and 128 combine to provide five distinct linear spring rates opposing the pull of the armature 80. These five spring rates are selected to provide opposing non-linear forces throughout the entire stroke corresponding to the non-linear pulling forces acting on the armature 80 by the magnetic flux to effectively cancel out the non-linearity so that the position of the valve 60 varies in proportion to the input signal (current) to the coil 20. This allows the metering device 10 to be used in applications, such as positioning actuators or delivering fuel to jet engines requiring precision control of fluid metering.

Figure 6:
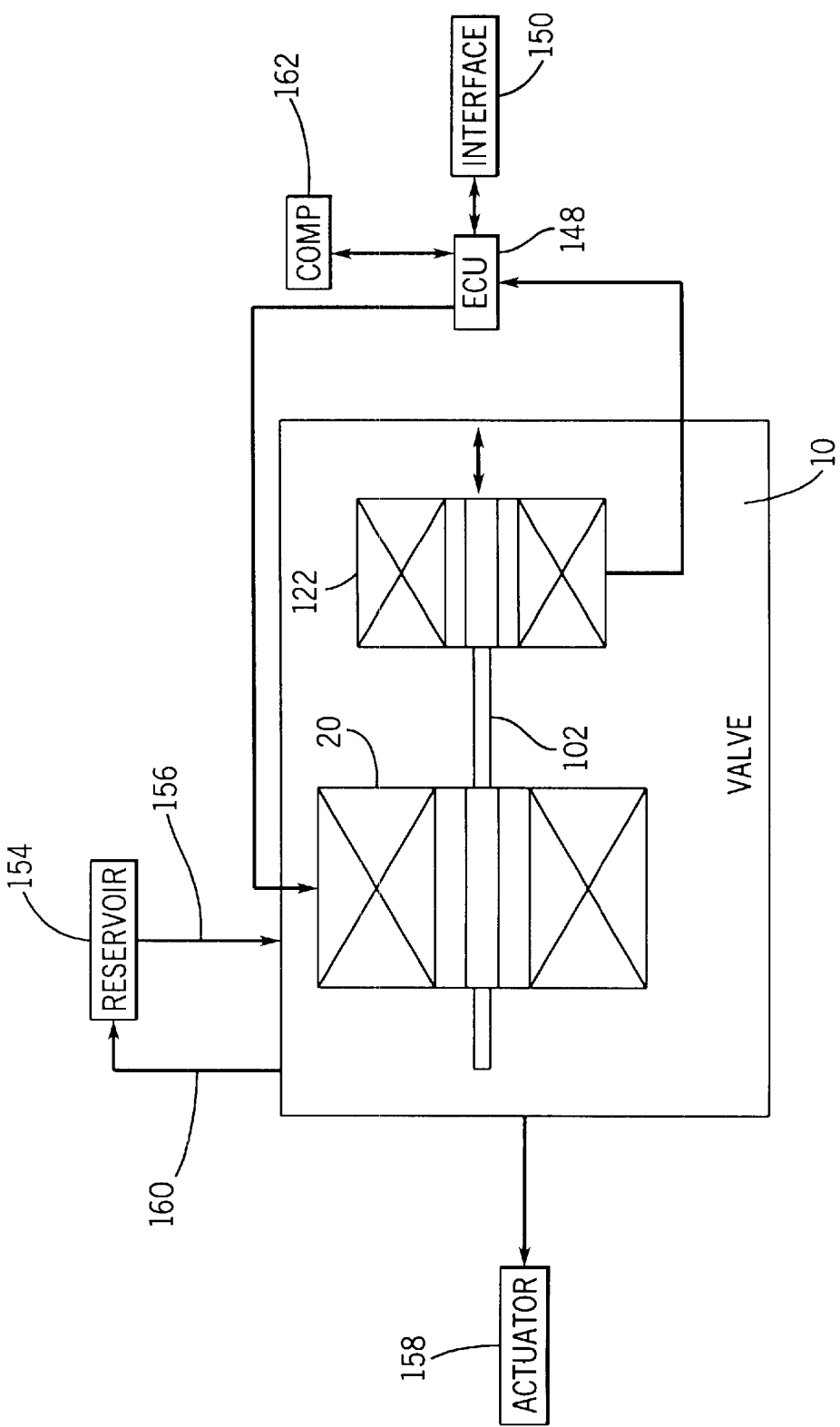
FIG. 6 is a block diagram of the metering device of the present invention in an exemplary actuator positioning system.

As mentioned, the metering device 10 operates according to the input signal sent to the coil 20. Referring to FIG. 6, the signal is preferably generated by an electronic control unit 148 in response to a signal from a user interface 150. The control unit 148 can be any suitable digital processing device, such as an on-board computer, having a suitable memory and I/O interface. In response to an input from the user interface 150, the control unit 148 can send an input signal of a particular electric current value to the coil 20 to open the valve 60. Pressurized hydraulic oil, for example, can be pumped from reservoir 154 through fluid line 156 to the inlet port 26, through the valve chamber 14 and out outlet port 28 (see FIG. 1) to a suitable hydraulic actuator 158. If the control unit 148 provides a signal to cut back power to the actuator, the valve 60 can be positioned to allow fluid within the valve chamber 14 to be evacuated to the reservoir 154 via return port 30 and return line 160.

To make the metering device 10 even more precise, the position transducer provides a feedback signal to the control unit 148 corresponding to the position of the transducer element 120 in the sensing coil 122, and thereby, the actual position of the valve 60. The control unit 148 provides the feedback signal to a suitable electronic comparator 162, which compares the feedback signal, corresponding to the actual position of the valve 60, to the input signal sent to the coil 20, corresponding to the commanded position. If the actual position and the commanded position are not the same, or within an acceptable range, the control unit 148 will execute stored algorithms to provide a corrected signal to the coil 20 until the difference is at or near zero.

A preferred embodiment of the invention has been described herein in detail. The invention may, however, include other aspects not specifically delineated in the aforementioned preferred embodiment. For example, the non-linear spring assembly could take other forms, such as having radially inwardly extending spring fingers or variously sized axially extending spring elements. Moreover, it is mentioned that the device is also suitable for accurately metering liquid fuel to jet engines. In that case, the return port and corresponding passages would be eliminated. Thus, the above in no way is intended to limit the scope of the invention. Accordingly, in order to apprise the public of the full scope of the present invention, reference must be made to the following claims.

What is claimed is:

1. A device for accurate metering of fluid, comprising:

a housing defining a valve chamber in fluid communication with an inlet port and an outlet port;

an electromagnet coil disposed within the housing that when energized by an input signal generates magnetic flux;

an armature translatable along a stroke axis toward the coil by a force induced by the magnetic flux;

a metering valve movable along the stroke axis by the armature; and a piece-wise non-linear spring communicating with the armature and having a plurality of spring fingers extending radially with respect to the stroke axis to independently engage between the armature and a stationary structure at different points as the armature is translated along the stroke axis so as to provide a summing of forces from each spring finger acting on the armature counter to the force induced by the magnetic flux so that the positioning of the metering valve is more nearly a linear function of the input signal to the coil.

2. The device of claim 1, wherein at least one of the spring fingers has a different thickness so that thicker spring fingers deflect before thinner spring fingers.

3. The device of claim 2, wherein the non-linear spring is an assembly of first and second flexure springs spaced along the stroke axis and mounted to the armature.

4. The device of claim 3, wherein each of the first and second flexure springs includes independently flexible spring fingers extending radially outward with respect to the stroke axis at equal angular spacing substantially perpendicular to the stroke axis and aligned to engage with movement of the armature.

5. The device of claim 4, wherein the first and second flexure springs each have four spring fingers with two pair of oppositely extending spring fingers having tips that include a tapered contact surface facing in the direction of the coil.

6. The device of claim 5, wherein the armature is translated along the stroke axis in the direction of the coil when the coil is energized, the non-linear spring assembly provides piece-wise forces acting on the armature by flexure of first, second, third and fourth pair of oppositely extending spring fingers at different portions of the armature stroke by contact of the spring fingers of the first flexure spring with a fixed interior surface of the housing and contact of the spring fingers of the second flexure spring with the corresponding spring fingers of the first flexure spring.

7. The device of claim 6, wherein the first pair of opposite spring fingers contact the interior surface of the housing at a first position of the armature, the second pair of opposite spring fingers contact the interior surface at tapered contact surfaces at a second position of the armature, the third pair of spring fingers contact the first pair of spring fingers at a third position of the armature, and the fourth pair of spring fingers contact the second pair of spring fingers at tapered contact surfaces at a fourth position of the armature such that the non-linear spring assembly provides four distinct spring rates.

8. The device of claim 7, further including an elongated axial rod connected to the armature and a compression spring disposed about the rod to bias the armature away from the coil and thereby provide a fifth distinct spring rate acting on the armature.

9. The device of claim 2, further including a position transducer including a sensing coil and a metallic transducer element fixed to the rod and disposed axially within the sensing coil.

10. The device of claim 9, further including an electronic control unit electrically coupled to the coil and the sensing coil.

11. The device of claim 10, wherein the position transducer provides a feedback signal to the control unit corresponding to the position of the transducer element and wherein the control unit can adjust the input signal supplied to the coil in response to the feedback signal.

12. The device of claim 11, wherein the control unit includes a comparator which compares a commanded metering valve position corresponding to the input signal to an actual metering valve position detected by the position transducer, and wherein the control unit adjusts the input signal until the difference between the actual and commanded metering valve positions is an acceptable value near zero.

13. The device of claim 2, wherein the metering valve is an assembly including:

a generally cylindrical guide fixed to the housing along the stroke axis, the guide including inlet and outlet openings in fluid communication with respective the inlet and outlet ports of the housing;

a cylindrical valve slidable along the diameter of the guide to alternatively block the inlet and outlet openings in the guide, the valve including an outer circumferential shoulder;

a valve carrier disposed about the valve and having an annular flange surface engaging the valve shoulder; and a compression spring disposed about the valve to engage the shoulder to bias the valve toward, and the valve carrier in contact with, the armature.

14. The device of claim 13, wherein the metering valve assembly further includes an annular spring retainer fixedly disposed about the guide to capture the spring.

* * * * *